April 9, 1935.  F. H. SCHLEICHER  1,996,834
PUZZLE
Filed March 20, 1933   2 Sheets-Sheet 1
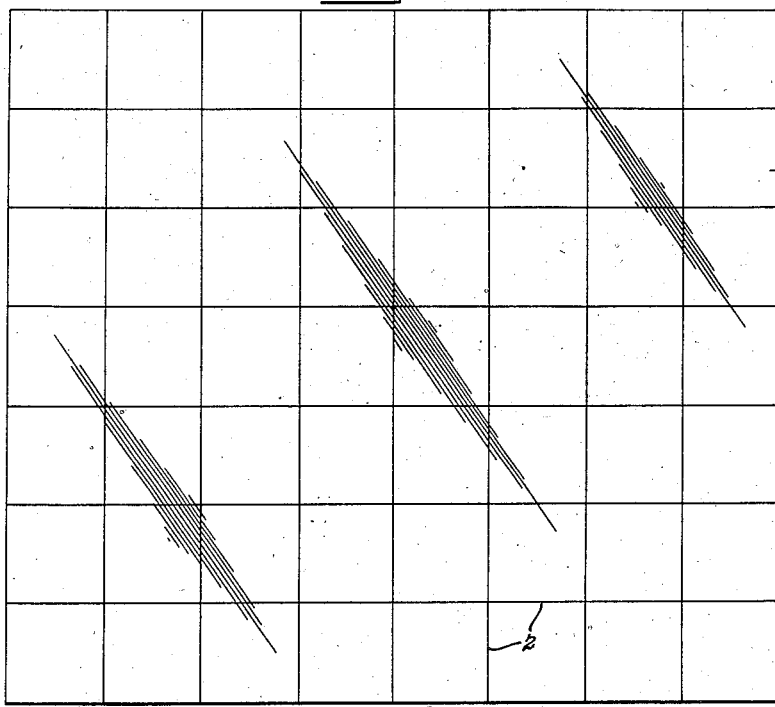
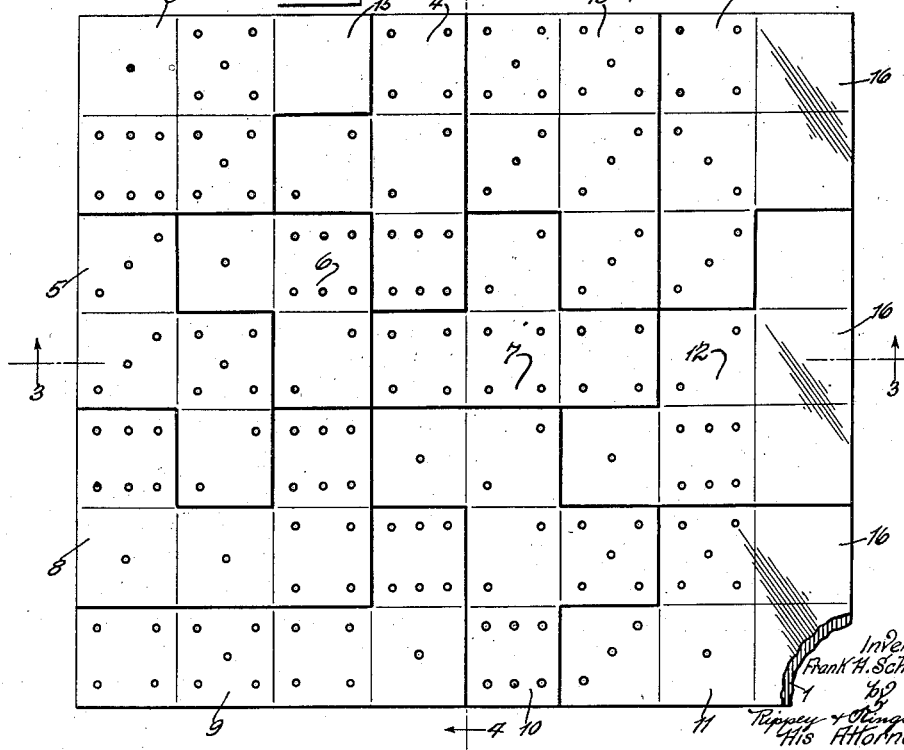

April 9, 1935.  F. H. SCHLEICHER  1,996,834
PUZZLE
Filed March 20, 1933   2 Sheets-Sheet 2
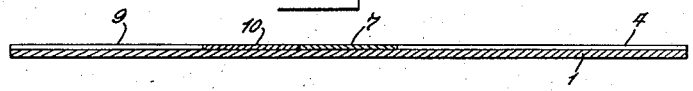
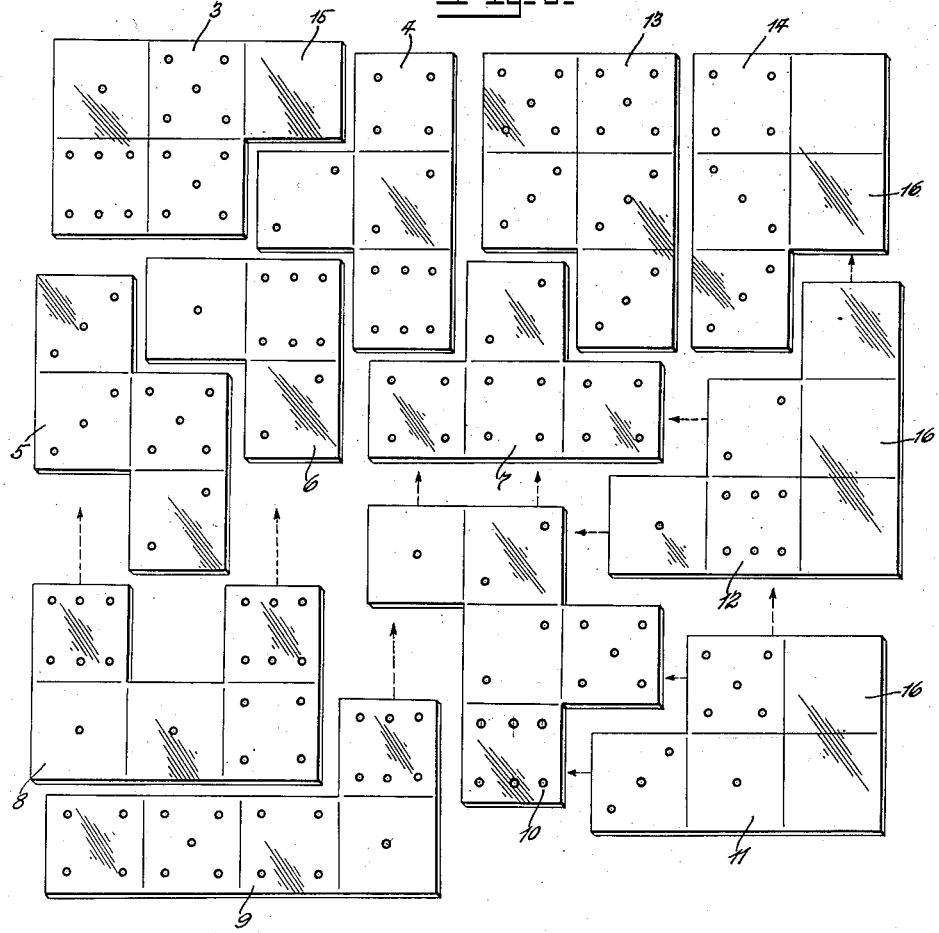
Inventor
Frank H. Schleicher
By Tippey + Stingsland
His Attorneys.

Patented Apr. 9, 1935

1,996,834

UNITED STATES PATENT OFFICE 1,996,834

PUZZLE

Frank H. Schleicher, St. Louis, Mo.

Application March 20, 1933, Serial No. 661,667

1 Claim. (Cl. 273—157)

This invention relates to puzzles, and an object of the invention is to provide a puzzle including a series of angular elements, each having portions extending angularly from each other, and each element having on its upper side more than two areas and having in each area one or more counting indicia, and said elements being adapted to be placed side by side in a predetermined edgewise abutting relationship to form a rectangular arrangement having vertical, horizontal and diagonal rows of indicia in which the sum of the indicia displayed along each row is the same as the sum of the indicia displayed along other parallel rows.

The elements are of various shapes having portions projecting angularly from each other and adapted to abut against the side edges of other elements of the series and be received in angular recesses or notches therein. In this way, the angular elements, when properly arranged, completely cover a rectangular area within which they are placed. It is possible to arrange the elements in edgewise abutting relationship to cover the rectangular area and make error so that the sum of the indicia along the respective margins or other rows is not equal. In this way, difficulties and problems are presented in working or solving the puzzle, affording pastime and entertainment to the players.

In the specific embodiment of the invention shown, the sum of the indicia in each row is equal to the sum of the indicia in any other row parallel therewith. And the sum of the indicia in each diagonal row from corner to corner is the same as the sum of the indicia along each horizontal and marginal row, when the puzzle is correctly worked or solved.

Another object of the invention is to provide an improved puzzle of the type and character indicated which may also be profitably and advantageously worked and solved, and which is particularly instructive to children and others whose studies include geometrical and arithmetical subjects.

Other objects will be apparent from the following description taken in connection with the accompanying drawings, in which—

Fig. 1 is a plan view of the base upon which the elements are to be assembled.

Fig. 2 is a plan view of the properly assembled elements.

Fig. 3 is a transverse sectional view on the line 3—3 of Fig. 2.

Fig. 4 is a vertical sectional view on the line 4—4 of Fig. 2.

Fig. 5 is a perspective view of the various elements arranged in proper relationship for assembly but spread apart in order more clearly to illustrate the cooperative relationship of the projecting angular portions with the notches or angles in abutting elements.

The base 1 may be made of cardboard or wood or other appropriate material. Said base is preferably rectangular and bears on its upper surface a series of coorthogonal lines 2 forming rectangular spaces of approximately the same area as the area of the respective defined areas on the elements in which the counting indicia are formed.

In the specific embodiment shown, I provide a series of elements indicated by the reference numerals 3 to 14, inclusive. It will be seen that each of these elements consists of a number of integrally united portions extending angularly from each other, and that the element 3 has a blank extension 15 of the same size as each defined area of said element 3 that contains counting indicia.

These elements 3 to 14, inclusive, are placed upon the base 1, the coorthogonal lines 2 functioning as guides along which the marginal edges of the various angular elements 3 to 14, inclusive, are to be properly located.

The elements 11, 12 and 14 have lateral blank extensions 16 functioning as cues or guides to indicate that these elements 11, 12 and 14 are to be placed along one marginal edge of the base 1. When these elements are placed in the relationship shown in Fig. 5, they are then to be moved to edgewise abutting contact, as shown in Fig. 2, thereby covering the base 1.

In this relationship, it will be seen that the counting indicia are in straight vertical and horizontal rows, and that the sum of the indicia along each of said rows is the same as the sum of the indicia along any other row, the sum being twenty-four in each row. Further, each diagonal row from corner to corner of the assembly contains indicia, the sum of which is twenty-four.

Some of these elements are reversible and interchangeable and the series may be arranged in rectangular formation, so that the sums of the indicia along the various rows will not be equal. Accordingly, some difficulties and problems are presented in the working and solution of this puzzle, requiring concentrated and interested attention and the exercise of skill to obtain proper solution.

It should be clear that numerals, either Roman or Arabic, may be used instead of the spots shown as counting indicia.

The elements may be made in different forms so long as each includes more than one complete piece analogous to a domino piece. It is possible that the invention may be varied otherwise than in this particular and, without restricting myself unessentially, I claim:

A device of the character described comprising a support having thereon side by side rows of clearly defined visible rectangular areas of uniform size, a series of angular elements each having portions extending angularly from each other and each element being of the same area as a plurality of said areas on said support and having edges arranged to register with the edges of said areas on said support covered by the respective elements when the respective elements are properly placed, and guides in connection with a plurality of said elements indicating the proper lateral position of said elements having said guides with respect to the remaining elements, all of said elements having edges adapted to be placed in abutting relationship to form a rectangular assembly of all of said elements covering all of said rectangular areas on said support, and said series of elements having on their upper sides rows of defined areas containing counting indicia which in the proper arrangement of the elements are of the same sum in one row as in any other row.

FRANK H. SCHLEICHER